United States Patent
Ishikawa et al.

(10) Patent No.: US 6,540,185 B2
(45) Date of Patent: Apr. 1, 2003

(54) TRIPOD ATTACHMENT FOR BINOCULARS

(75) Inventors: Kiyotaka Ishikawa, Saitama (JP); Kenjiro Okamura, Saitama (JP); Kunikazu Izumi, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/940,532

(22) Filed: Aug. 29, 2001

(65) Prior Publication Data

US 2002/0023989 A1 Feb. 28, 2002

(30) Foreign Application Priority Data

Aug. 30, 2000 (JP) .......................... 2000-261578

(51) Int. Cl.[7] .............................................. A47B 91/00
(52) U.S. Cl. ................. 248/187.1; 248/178.1; 248/183.2; 359/420; 362/191
(58) Field of Search .................... 248/177.1, 187.1, 248/183.2, 288.51, 231.21; 359/407, 420, 429; 362/191, 396

(56) References Cited

U.S. PATENT DOCUMENTS

| | | | | | |
|---|---|---|---|---|---|
| 3,563,154 A | * | 2/1971 | Henning | .................. | 248/187.1 |
| 3,870,265 A | * | 3/1975 | Oborne | .................... | 248/183.2 |
| 4,278,320 A | * | 7/1981 | Carreira, Sr. | ............... | 359/407 |
| 5,078,355 A | * | 1/1992 | Fujimoto et al. | ........ | 248/183.2 |
| 5,564,817 A | * | 10/1996 | Palmer | ...................... | 362/191 |
| 5,725,187 A | * | 3/1998 | Vo | ........................... | 248/178.1 |
| 5,930,036 A | * | 7/1999 | Cluff | ........................... | 359/420 |

FOREIGN PATENT DOCUMENTS

| JP | 8-50248 | * | 2/1996 |
|---|---|---|---|
| JP | 3064125 | | 9/1999 |

* cited by examiner

*Primary Examiner*—Leslie A. Braun
*Assistant Examiner*—Tan Le
(74) *Attorney, Agent, or Firm*—Birch, Stewart, Kolasch & Birch, LLP

(57) ABSTRACT

The tripod attachment for attaching a pair of binoculars to a tripod has a friction force producing member providing friction force to hold the pair of binoculars at any desired position with respect to an attachment body when fastening a screw member to the pivot of the pair of binoculars and at the same time to allow the entire pair of binoculars to rotate around the screw member only when certain external force is applied to the pair of binoculars. Therefore, the horizontal correction of the pair of binoculars can be performed only by rotating the pair of binoculars; thus, the tripod attachment can be easily handled. When performing the horizontal correction of the pair of binoculars with the tripod attachment, external rotating force is applied to the pair of binoculars so that the entire pair of binoculars rotates around the screw member against the friction force. Then, application of rotating force to the pair of binoculars is stopped at the position where the telescopes constituting the pair of binoculars are horizontally arranged, and the pair of binoculars is held at the position by the friction force.

6 Claims, 6 Drawing Sheets

EYEPIECE-INTERVAL ADJUSTMENT

FIG. 4 (B)

HORIZONTAL CORRECTION

TRIPOD ATTACHMENT FOR BINOCULARS

BACKGROUND OF THE INVENTION

1. Field of the Invention

The present invention relates to a tripod attachment through which a pair of binoculars is mounted on a tripod.

2. Description of the Related Art

Japanese Utility Model No. 3064125 discloses a tripod attachment for a pair of binoculars, which comprises an attachment body, a collet chuck, and a chuck lever. The collet chuck is inserted into a tapered hole of the attachment body, and the chuck lever is connected with the collet chuck. The pair of binoculars comprises two small telescopes fitted together side by side through a pair of bridges with a pivot. In order to attach the pair of binoculars to the tripod attachment, a bolt protruding from the pivot is inserted into the collet chuck, and the collet chuck is then pulled into the tapered hole by fastening the chuck lever. By this operation, jaw members of the collet chuck are closed so as to press and hold the bolt with the jaw members, and the pair of binoculars is thus attached to the attachment body through the collet chuck.

In order to practically use the pair of binoculars, an interval between eyepieces of the two telescopes must be adjusted to the interval between the eyes of the user by revolving the two telescopes on the pivot with respect to each other (this adjustment is hereinafter referred to as eyepiece-interval adjustment). One of the telescopes is connected with the bridge on which the pivot is rigidly attached, and the other of the telescopes is connected with the other bridge that is rotatably connected on the pivot. Hence, even though the pair of binoculars is mounted on the tripod through the tripod attachment so as to make the two telescopes horizontally arranged before the eyepiece-interval adjustment, the two telescopes become not horizontally arranged after the eyepiece-interval adjustment, since only one of the telescopes is revolved on the pivot; consequently, right and left fields of views are inclined from the horizontal. Then, the inclination of the pair of binoculars should be corrected by rotating the entire pair of binoculars around the pivot so that the two telescopes are horizontally arranged (this correction is hereinafter referred to as horizontal correction).

In order to solve that problem with the conventional tripod attachment, the chuck lever is loosened after the eyepiece-interval adjustment, and the pair of binoculars is rotated to make the two telescopes horizontally arranged to correct the inclination of the fields of views, then the chuck lever is fastened again.

The conventional tripod attachment thus requires operations for loosening and fastening the chuck lever in order to perform the horizontal correction after the eyepiece-interval adjustment, and handling such a tripod attachment is bothering.

Moreover, since the conventional tripod attachment has a short coupling part for coupling the collet chuck and the bolt on the hinge joint of the pair of binoculars, the bolt sometimes accidentally falls from the collet chuck.

SUMMARY OF THE INVENTION

The present invention has been developed in view of the above-described circumstances, and has as its object the provision of a tripod attachment that enables an easy horizontal adjustment and enables easy handling.

In order to achieve the above-described objects, the present invention is directed to a tripod attachment for attaching a pair of binoculars having a pivot to a tripod, the tripod attachment comprising: an attachment body which is attached to the tripod, the attachment body having a hole; a shaft member which is rotatably inserted through the hole of the attachment body, an end of the shaft member being fastened to the pivot of the pair of binoculars; and a friction force producing member which is arranged at the attachment body, the friction force producing member producing friction force when fastening the shaft member to the pivot, the friction force holding the pair of binoculars at any desired position with respect to the attachment body, the friction force allowing the pair of binoculars to rotate around the shaft member only when certain external force is applied to the pair of binoculars.

According to the present invention, the attachment body is attached to the tripod, and the shaft member is rotatably inserted through the hole of the attachment body and fastened to the pivot, whereby the pair of binoculars is attached to the tripod through the tripod attachment. Then, one of two telescopes constructing the pair of binoculars is revolved on the pivot so as to adjust the interval between the eyepieces, and the entire pair of binoculars is rotated around the shaft member against the friction force produced by the friction force producing member. After that, when application of rotating force to the pair of binoculars is stopped at a position where the two telescopes are horizontally arranged, the pair of binoculars is held at the position by the friction force produced by the friction producing member. Therefore, the tripod attachment of the present invention can be easily handled since it enables the horizontal correction without loosening and fastening the shaft member.

Preferably, the pivot of the pair of binoculars has a threaded hole; the shaft member has a threaded portion on the end thereof; and the shaft member is fastened to the pivot by screwing the threaded portion in the threaded hole.

According to the present invention, the pair of binoculars is not accidentally detached from the tripod attachment, since a fastening structure is used as the attaching structure between the tripod attachment and the pair of binoculars with which the screw member is fastened to the pivot.

According to an embodiment of the present invention, the friction force producing member comprises a sleeve which is inserted in the hole of the attachment body, the shaft member being inserted through the sleeve, the sleeve comprising: an extending part which is extended when the shaft member is inserted in the sleeve; and an engaging part which engages with the pivot of the pair of binoculars so that the sleeve is rotated when the pivot rotates, wherein the friction force is produced between the extending part being extended and the hole of the attachment body.

According to another embodiment of the present invention, the friction force producing member comprises: an annular body through which the shaft member is inserted, the annular body having an engaging part which engages with the pivot of the pair of binoculars so that the annular body is rotated when the pivot rotates; and a pressing member arranged between the annular body and the attachment body, the pressing member pressing the annular body toward the pivot, wherein the friction force is produced between the annular body and the pressing member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder preferred embodiments for a tripod attachment of binoculars according to the present invention will be described in detail according to the accompanied drawings.

Figure 1:
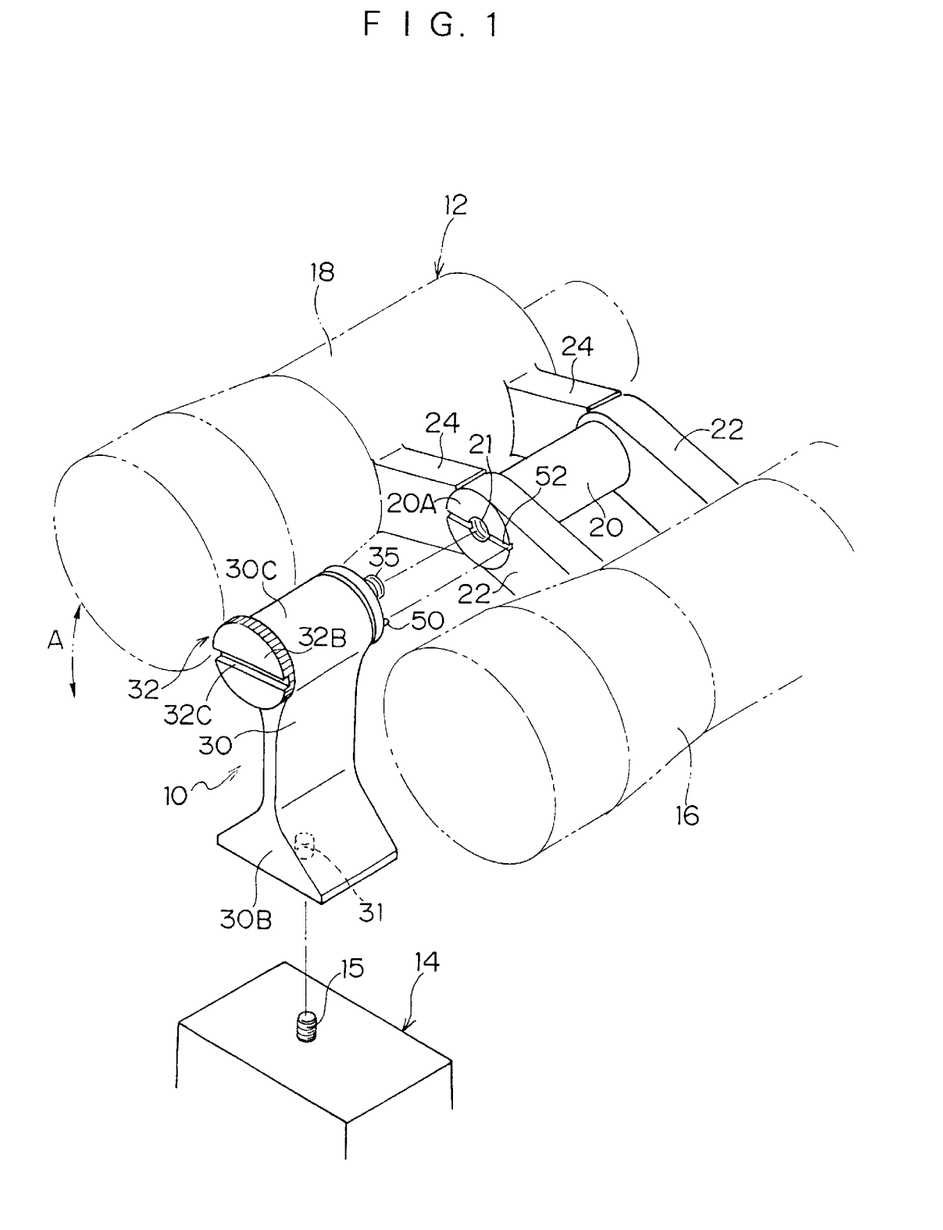
FIG. 1 is a view showing a state where a pair of binoculars is attached to a tripod through a tripod attachment in the first embodiment.

FIG. 1 is a view showing a state where a pair of binoculars 12 is mounted on a head of tripod 14 through a tripod attachment 10 according to the first embodiment of the present invention. Telescopes 16 and 18 constituting the pair of binoculars 12 are connected with a pivot 20 through bridges 22 and 24, respectively. The telescope 16 has the bridge 22 that is rigidly attached to the pivot 20, while the telescope 18 has the bridge 24 that is rotatably connected on the pivot 20. Therefore, in the pair of binoculars 12, an interval between eyepieces of the telescopes 16 and 18 is adjusted by revolving the telescope 18 with respect to the pivot 20 in directions of an arrow A in FIG. 1.

Figure 2:
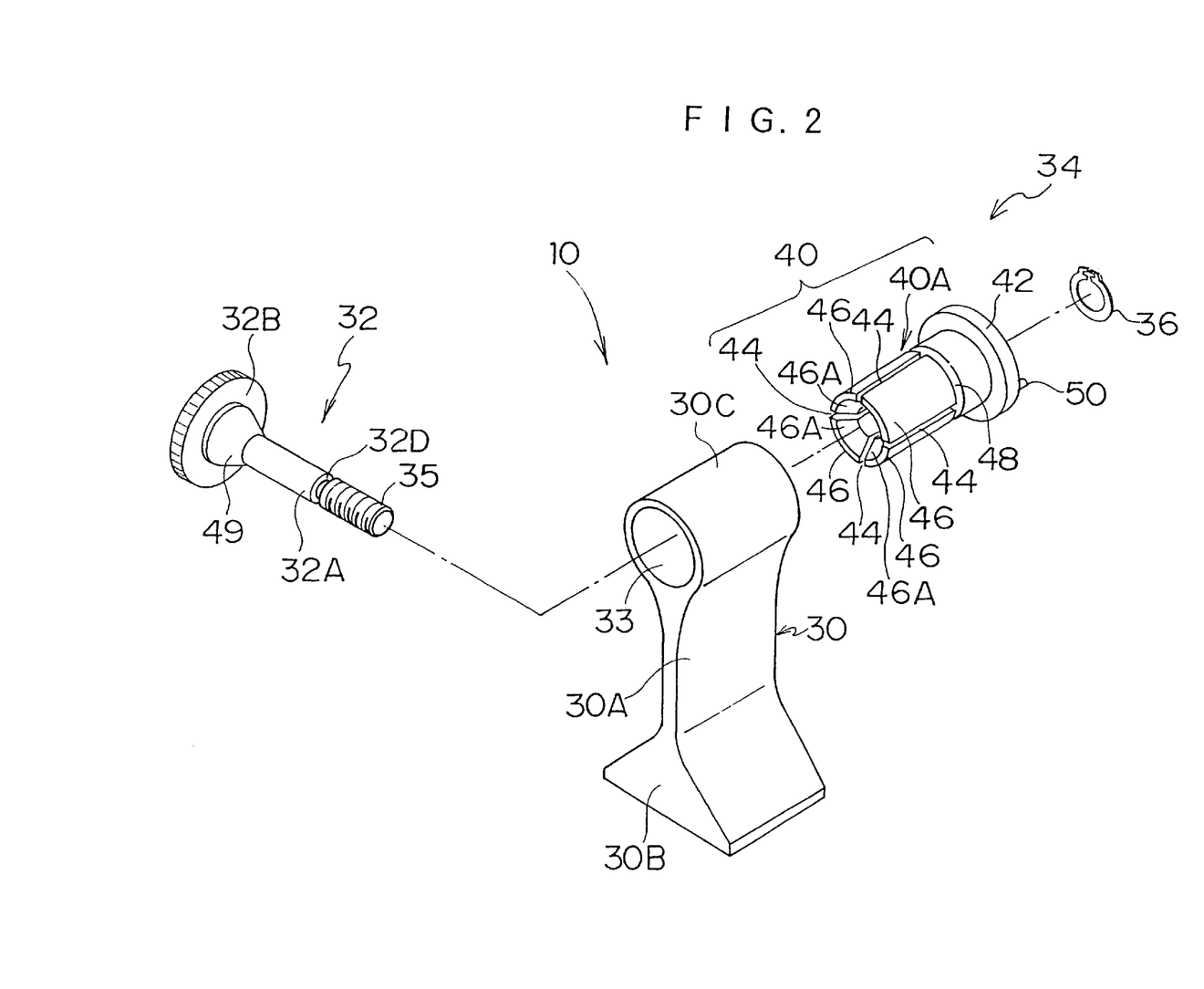
FIG. 2 is an exploded perspective view of the tripod attachment in FIG. 1.

As shown in FIGS. 1 and 2, the tripod attachment 10 comprises an attachment body 30, a shaft member or a screw member 32, and a friction force producing member or a sleeve 34. The attachment body 30 has a central part 30A, which is thin so that it can be inserted through a narrow space between the telescopes 16 and 18. The attachment body 30 also has a base 30B with a triangular vertical-section providing sufficient strength. A threaded hole 31 is formed at the bottom face of the base 30B, and a screw 15 protruding from the head of the tripod 14 is screwed in the threaded hole 31. Engaging the threaded hole 31 with the screw 15 attaches the tripod attachment 10 to the tripod 14.

Figure 3:
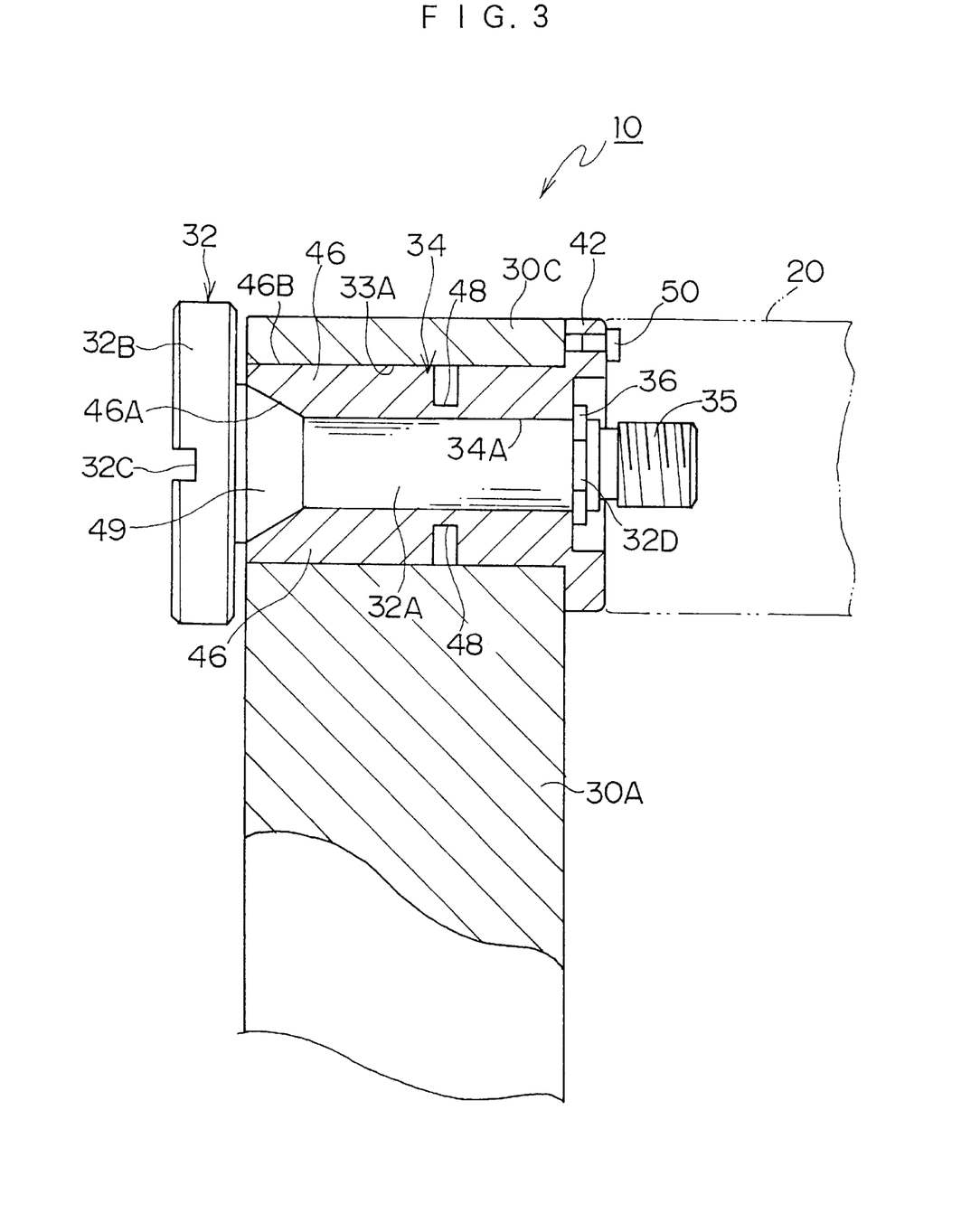
FIG. 3 is an enlarged section view showing essential parts of the tripod attachment in FIG. 1.

As shown in FIGS. 2 and 3, the attachment body 30 has a top 30C, in which a hole 33 is formed, and the sleeve 34 is inserted in the hole 33. A hole 34A is formed in the sleeve 34, and a shank 32A of the screw member 32 is rotatably inserted through the hole 34A from the side of the top 30C. The screw member 32 has the shank 32A, a head 32B formed on an end of the shank 32A, a threaded portion 35 formed on the other end of the shank 32A, and a cone-shaped tapered portion 49 formed between the shank 32A and the head 32B. A slot 32C is formed on a face of the head 32B (see FIG. 1), and a groove 32D is formed on a cylindrical face of the shank 32A nearby the threaded portion 35 (see FIGS. 2 and 3). In the state where the shank 32A is inserted in the hole 34A, the threaded portion 35 and a part of the shank 32A including the groove 32D protrude from the hole 34A, and a C-shaped ring 36 is put on the groove 32D. The screw member 32 is thereby prevented from being detached from the sleeve 34 with the C-shaped ring 36, and the sleeve 34 is prevented from falling off the hole 33 with the C-shaped ring 36 and the head 32B. The threaded portion 35 is screwed in a threaded hole 21 formed in a front end face 20A of the pivot 20 of the pair of binoculars 12 shown in FIG. 1, whereby the tripod attachment 10 is attached to the pair of binoculars 12.

The sleeve 34 comprises an extending part 40 and a flange 42 as shown in FIG. 2. The extending part 40 is inserted in the hole 33. Four slits 44 are formed in an outer periphery 40A of the extending part 40 in the axial direction with equal intervals; whereby four extending pieces 46 are formed. A grooved portion 48 is formed in the outer periphery 40A at a boundary between the extending part 40 and the flange 42 in the peripheral direction as shown in FIGS. 2 and 3, and the grooved portion 48 makes the extending pieces 46 movable in radial directions with predetermined elasticity.

A tapered face 46A is formed on an end face at the left-hand side in FIG. 3 of each of the extending pieces 46. The tapered faces 46A are directed to the hole 34A of the sleeve 34. When fastening the screw member 32 (i.e., when attaching the tripod attachment 10 to the pair of binoculars 12), the tapered faces 46A are pressed by the cone-shaped tapered portion 49 of the screw member 32. By this operation, the extending pieces 46 are extended with the grooved portion 48 as pivots, and outer peripheral faces 46B of the extending pieces 46 are pressed on an inner peripheral face 33A of the hole 33.

Friction force is thereby produced between the outer peripheral faces 46B of the extending pieces 46 and the inner peripheral face 33A of the hole 33. This friction force is set to have appropriate force that bears the weight of the pair of binoculars 12 so as to be capable of holding the pair of binoculars 12 at any desired position with respect to the attachment body 30, and at the same time allows the entire pair of binoculars 12 to rotate around the screw member 32 only when certain external force is applied to the pair of binoculars 12.

An engaging part or a pin 50 is attached on the flange 42 of the sleeve 34. The pin 50 is engaged with a slot 52, which is formed at a front-end face 20A of the pivot 20 in the direction of the diameter as shown in FIG. 1. Since the pin 50 is engaged with the slot 52, when the entire pair of binoculars 12 rotates around the screw member 32, the sleeve 34 rotates together with the pair of binoculars 12. The friction force mentioned above is applied to the sleeve 34 at that time, and the pair of binoculars 12 is thereby held at the position when application of the rotating force to the pair of binoculars 12 is stopped.

Hereunder, the operation of the tripod attachment 10, which is constructed as described above, will be described.

First, the screw 15 on the head of the tripod 14 is screwed in the threaded hole 31 of the attachment body 30 in FIG. 1, whereby the tripod attachment 10 is attached to the tripod 14.

Second, the threaded portion 35 of the screw member 32 is screwed in the threaded hole 21 on the face 20A of the pivot 20 of the pair of binoculars 12, whereby the pair of binoculars 12 is attached to the tripod 14 through the tripod attachment 10.

Figure 4:
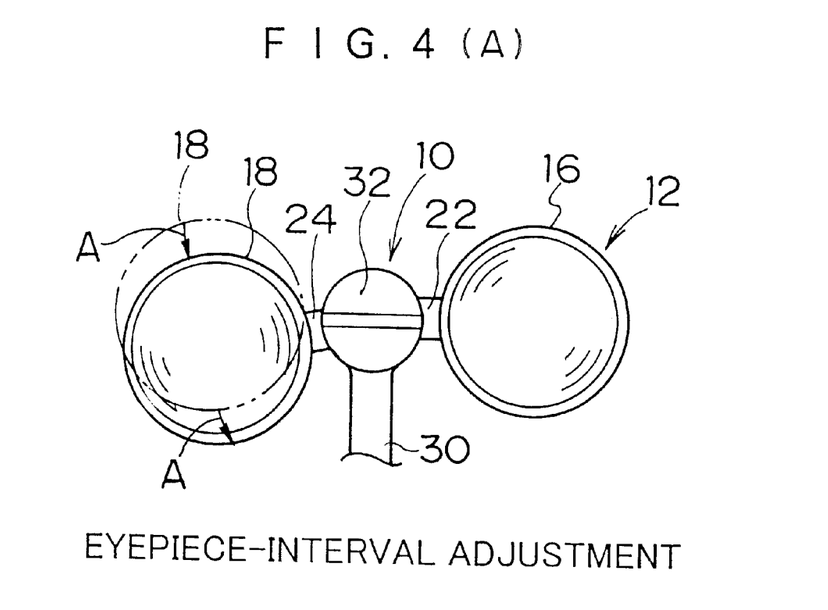
FIG. 4(A) is a view illustrating eyepiece-interval adjustment of the pair of binoculars.
FIG. 4(B)is a view illustrating horizontal correction of the pair of binoculars.

Third, as shown in FIG. 4(A), the eyepiece interval of the pair of binoculars 12 is adjusted by revolving the telescope 18 in a direction of an arrow A (the direction may be reverse to the direction of the arrow A) with respect to the pivot 20. At that point, since friction force is produced between the bridge 24 and the pivot 20 so that the telescope 18 is prevented from revolving only by the weight of the telescope 18, the telescope 18 is held at the position at that point when application of revolving force to the telescopes 18 is stopped.

Fourth, the inclination of the pair of binoculars 12 is corrected so that the two telescopes 16 and 18 are horizontally arranged. In that case, external rotating force is applied to the pair of binoculars 12 so that the entire pair of binoculars 12 rotates around the screw member 32 at the tripod attachment 10 in a direction of arrows B in FIG. 4(B) against the friction force between the hole 33 and the sleeve 34. Then, application of rotating force to the pair of binoculars 12 is stopped at the position where the telescopes 16 and 18 are horizontally arranged, and the pair of binoculars 12 is held at the position by the friction force between the hole 33 and the sleeve 34.

Therefore, the tripod attachment 10 of the present embodiment enables the horizontal correction only by rotating the pair of binoculars 12 without loosening (and fastening afterward) the screw member 32; hence the tripod attachment 10 can be handled more easily as compared with the conventional tripod attachment.

Moreover, since a structure for attaching the tripod attachment 10 and the pair of binoculars 12 uses a fastening structure in which the screw member 32 is fastened to the pivot 20, the pair of binoculars 12 is prevented from being accidentally detached from the tripod attachment 10.

Figure 5:
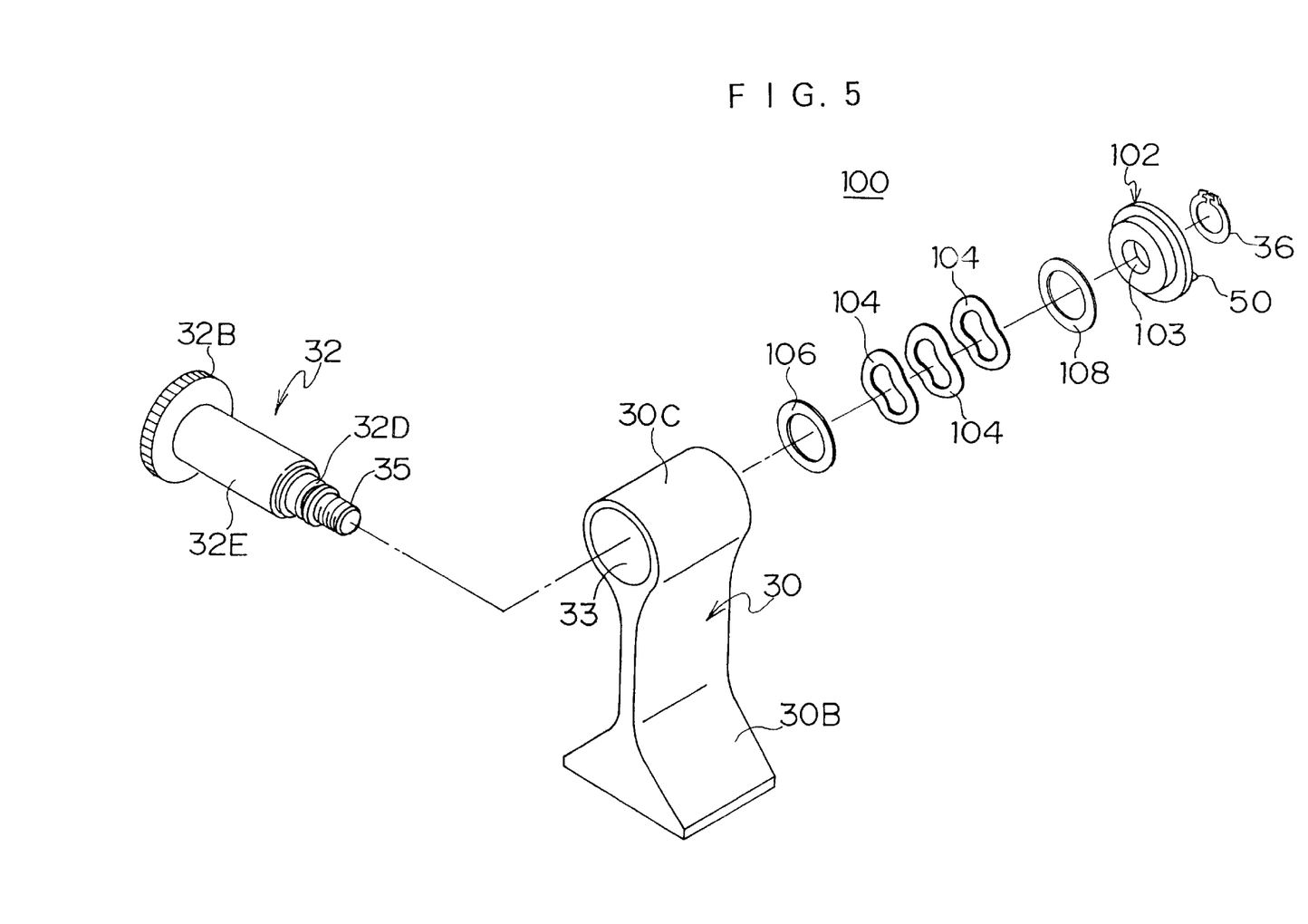
FIG. 5 is an exploded perspective view of a tripod attachment in the second embodiment.
Figure 6:
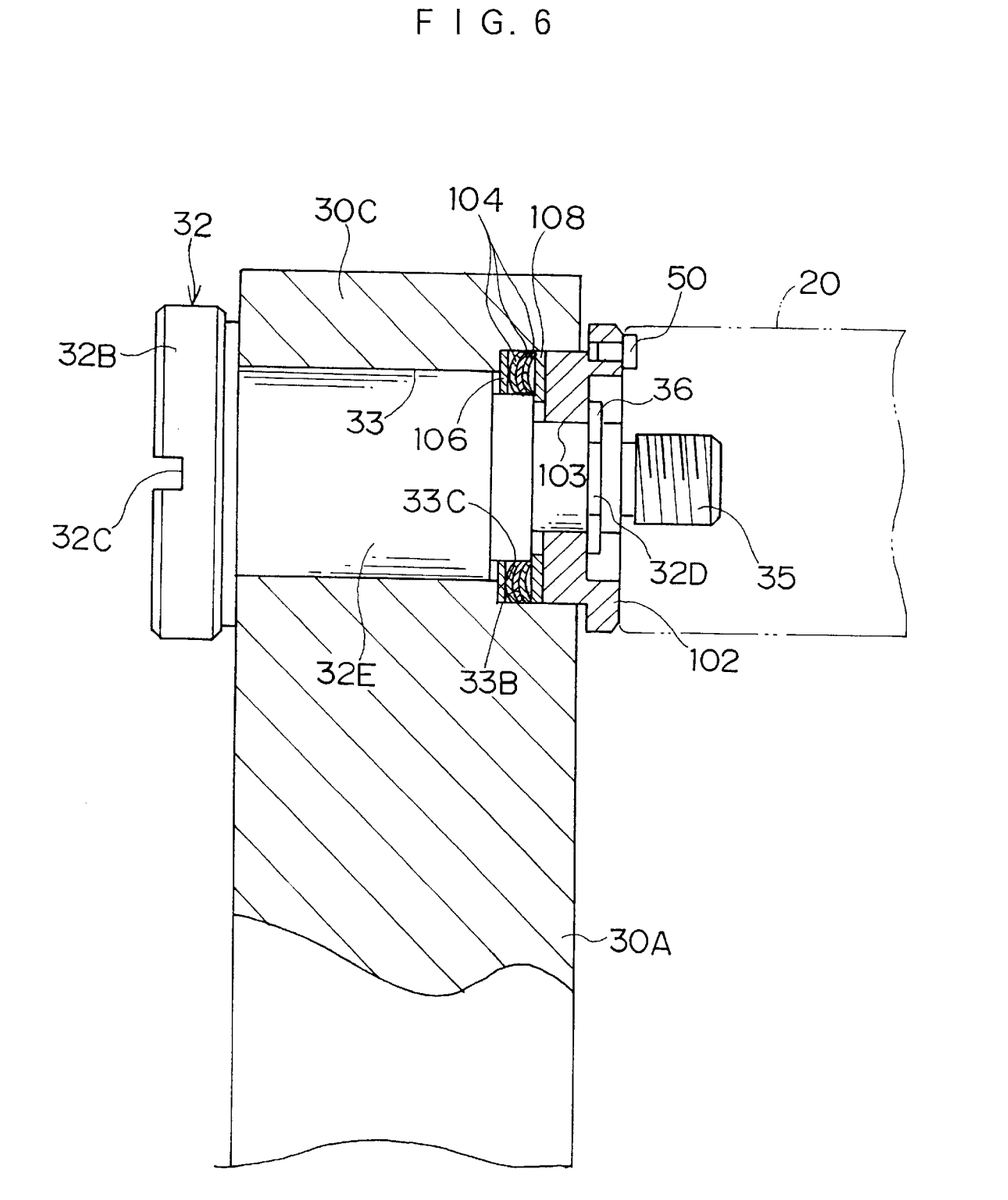
FIG. 6 is an enlarged section view showing essential parts of the tripod attachment in FIG. 5.

FIGS. 5 and 6 are views showing a tripod attachment 100 according to the second embodiment of the present invention. The same or similar members as those with the tripod attachment 10 in the first embodiment shown in FIGS. 1 through 4 will be denoted with the same numbers and characters and will not be described.

The tripod attachment 100 comprises the attachment body 30, the screw member 32, an annular body or a cap 102, and pressing members or three wavy washers 104.

A shank 32E of the screw member 32 is directly inserted through the hole 33 of the attachment body 30, and the shank 32E is hence formed to have a larger diameter than the diameter of the shank 32A of the screw member 32 in the first embodiment. The tapered portion 49 of the screw member 32 in the first embodiment is not formed on the screw member 32 in the second embodiment.

The cap 102 has an annular shape, and the shank 32E of the screw member 32 is inserted through an opening 103 of the cap 102 so that the threaded portion 35 and a part of the shank 32E including the groove 32D protrude from the opening 103. The screw member 32 is prevented from being detached from the cap 102 with the C-shaped ring 36 put on the groove 32D.

The hole 33 of the attachment body 30 has a step 33B. The three wavy washers 104 are piled on each other and are arranged at the step 33B in a state of being sandwiched between pressing rings 106 and 108, which are arranged at both sides of the wavy washers 104. The wavy washers 104 are also arranged in the hole 33 in a state where they are sandwiched between the side face 33C of the step 33B and the cap 102 through the pressing rings 106 and 108, whereby pressing force produced by the wavy washers 104 is transmitted to the cap 102 through the pressing ring 108. Thus, the cap 102 is pressed to the pivot 20 by the pressing force of the wavy washers 104, and friction force is produced between the pressing ring 108 and the cap 102. This friction force is set to have appropriate force that bears the weight of the pair of binoculars 12 so as to be capable of holding the pair of binoculars 12 at any desired position with respect to the attachment body 30, and at the same time allows the entire pair of binoculars 12 to rotate around the screw member 32 only when certain external force is applied to the pair of binoculars 12. In short, the friction force of the tripod attachment 100 in the second embodiment is set to have the force that serves the same roles as the friction force of the tripod attachment 10 in the first embodiment.

When performing the horizontal correction of the pair of binoculars 12 with the tripod attachment 100, which is constructed as described above, external rotating force is applied to the pair of binoculars 12 so that the entire pair of binoculars 12 rotates around the screw member 32 against the friction force produced between the pressing ring 108 and the cap 102. Then, application of rotating force to the pair of binoculars 12 is stopped at the position where the telescopes 16 and 18 are horizontally arranged, and the pair of binoculars 12 is held at the position by the friction force between the pressing ring 108 and the cap 102.

Thus, the tripod attachment 100 also enables the horizontal correction of the pair of binoculars 12 by rotating the pair of binoculars 12 without loosening and fastening the screw member 32.

As described hereinabove, the tripod attachment of the present invention has the friction force producing member providing the friction force to hold the pair of binoculars at any desired position with respect to the attachment body when fastening the screw member to the pivot of the pair of binoculars and at the same time to allow the entire pair of binoculars to rotate around the screw member only when certain external force is applied to the pair of binoculars. Therefore, the horizontal correction of the pair of binoculars can be performed only by rotating the pair of binoculars; thus, the tripod attachment can be easily handled.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. In combination, a pair of binoculars having a pivot and a tripod attachment for attaching to the pivot of the pair of binoculars, the tripod attachment comprising:

an attachment body which is attached to the tripod, the attachment body having a hole;

a shaft member which is rotatably inserted through the hole of the attachment body;

an end of the shaft member being fastened to the pivot of the pair of binoculars; and a friction force producing member which is adjacent to the attachment body, the friction force producing member producing a friction force when fastening the shaft member to the pivot, the friction force holding the pair of binoculars at any desired position with respect to the attachment body, the friction force allowing the pair of binoculars to rotate around the shaft member only when certain external force is applied to the pair of binoculars, wherein the friction force producing member further includes a sleeve which is inserted in the hole of the attachment body, the shaft member being inserted through the sleeve, the sleeve further including an extending part which is extended when the shaft member is inserted in the sleeve; and an engaging part engaging the pivot of the pair of binoculars so that the sleeve is rotated when the pivot rotates, wherein the friction force is produced between the extending part being extended and the hole of the attachment body.

2. The tripod attachment according to claim 1, wherein:

the pivot of the pair of binoculars has a threaded hole;

the shaft member has a threaded portion on the end thereof; and the shaft member is fastened to the pivot by screwing the threaded portion in the threaded hole.

3. In combination, a pair of binoculars having a pivot and a tripod attachment for attaching to the pivot of the pair of binoculars, the tripod attachment comprising:

an attachment body which is attached to the tripod, the attachment body having a hole;

a shaft member which is rotatably inserted through the hole of the attachment body;

an end of the shaft member being fastened to the pivot of the pair of binoculars;

a friction force producing member adjacent to the attachment body, the friction force producing member producing a friction force when fastening the shaft member to the pivot, the friction force holding the pair of binoculars at any desired position with respect to the attachment body, the friction force allowing the pair of binoculars to rotate around the shaft member only when certain external force is applied to the pair of binoculars;

an annular body through which the shaft member is inserted, the annular body having an engaging part which engages with the pivot of the pair of binoculars so that the annular body is rotated when the pivot rotates; and a pressing member arranged between the annular body and the attachment body, the pressing member pressing the annular body toward the pivot, wherein the friction force is produced between the annular body and the pressing member.

4. The tripod attachment according to claim 3, wherein:

the pivot of the pair of binoculars has a threaded hole;

the shaft member has a threaded portion on the end thereof; and the shaft member is fastened to the pivot by screwing the threaded portion in the threaded hole.

5. A tripod attachment comprising:

an attachment body capable of being attached to a tripod, the attachment body having a hole;

a shaft member rotatably inserted through the hole of the attachment body;

an end of the shaft member being capable of being fastened to a pivot of a pair of binoculars; and a friction force producing member adjacent to the attachment body, the friction force producing member capable of producing a friction force when fastening the shaft member to the pivot, the friction force allowing the pair of binoculars to rotate around the shaft member only when an external rotational force is applied to the pair of binoculars, wherein the friction force producing member includes a sleeve being inserted in the hole of the attachment body, the shaft member being inserted through the sleeve, the sleeve further including an extending part which is extended when the shaft member is inserted in the sleeve; and an engaging part capable of engaging the pivot of the pair of binoculars so that the sleeve is rotated if the pivot rotates, wherein the friction force is produced between the extending part being extended and the hole of the attachment body.

6. A tripod attachment comprising:

an attachment body capable of being attached to a tripod, the attachment body having a hole;

a shaft member which is rotatably inserted through the hole of the attachment body;

an end of the shaft member being capable of being fastened to a pivot of a pair of binoculars;

a friction force producing member adjacent to the attachment body, the friction force producing member capable of producing a friction force when fastening the shaft member to the pivot, the friction force allowing the pair of binoculars to rotate around the shaft member only when a rotational external force is applied to the pair of binoculars;

an annular body, said shaft member being inserted through the annular body;

an engaging part on the annular body capable of engaging the pivot of the pair of binoculars so that the annular body is rotated if the pivot rotates; and a pressing member arranged between the annular body and the attachment body, the pressing member pressing the annular body toward the pivot, wherein the friction force is produced between the annular body and the pressing member.

* * * * *